US012558696B2

(12) United States Patent
Zhang et al.

(10) Patent No.: US 12,558,696 B2
(45) Date of Patent: Feb. 24, 2026

(54) SLURRY MAGNETIC FILTER APPARATUS AND CLEANING METHOD THEREOF

(71) Applicant: Guangdong Sophon Intelligent Technology Co., Ltd, Dongguan (CN)

(72) Inventors: Xin Zhang, Dongguan (CN); Zhen Duan, Dongguan (CN); Jianli Yuan, Dongguan (CN); Junzhi Liao, Dongguan (CN)

(73) Assignee: Guangdong Sophon Intelligent Technology Co., Ltd, Dongguan (CN)

( * ) Notice: Subject to any disclaimer, the term of this patent is extended or adjusted under 35 U.S.C. 154(b) by 108 days.

(21) Appl. No.: 18/533,101

(22) Filed: Dec. 7, 2023

(65) Prior Publication Data

US 2025/0099976 A1 Mar. 27, 2025

(30) Foreign Application Priority Data

Sep. 27, 2023 (CN) ......................... 202311272416.4

(51) Int. Cl.
*B03C 1/28* (2006.01)
*B03C 1/12* (2006.01)
(Continued)

(52) U.S. Cl.
CPC ................ *B03C 1/284* (2013.01); *B03C 1/12* (2013.01); *B08B 1/165* (2024.01); *B08B 1/20* (2024.01);
(Continued)

(58) Field of Classification Search
CPC .. B03C 1/10; B03C 1/12; B03C 1/286; B08B 1/165
(Continued)

(56) References Cited

U.S. PATENT DOCUMENTS

2018/0311680 A1* 11/2018 Hanai ........................ B03C 1/30
2022/0388867 A1* 12/2022 Cho ........................ C02F 1/003
2023/0147141 A1* 5/2023 Wey ........................ B03C 1/284
210/695

FOREIGN PATENT DOCUMENTS

CN 218423352 U * 2/2023 ............... B03C 1/02
CN 219291645 U * 7/2023 ............... B03C 1/02
(Continued)

OTHER PUBLICATIONS

Ma; Jun, "Multi-stage U-shaped Iron Removal Trolley for Battery Slurry" (English Translation), Feb. 3, 2023, worldwide.esapcenet.com (Year: 2023).*
(Continued)

*Primary Examiner* — Molly K Devine
(74) *Attorney, Agent, or Firm* — Andrew C. Cheng

(57) ABSTRACT

A magnetic adsorption of the apparatus includes multiple magnetic adsorption barrels each including a barrel body, a magnetic roller arranged in an interior of the barrel body, and a scrape ring. The magnetic roller is reciprocally slidable relative to the scrape ring. The magnetic roller includes a roller body, a permanent magnet, a directing end-wing connected to a free end of the roller body, and a permanent magnet driving and moving mechanism. The roller body is reciprocally slidable relative to the scrape ring. The permanent magnet is arranged in the interior of the roller body. The permanent magnet driving and moving mechanism can drive the permanent magnet to move in a direction approaching or away from the directing end-wing. The slurry magnetic filter apparatus adopts a permanent magnet as a magnetic adsorption system with a relatively large effective magnetic adsorption surface area for better resolving the cleaning issues.

16 Claims, 11 Drawing Sheets

(51) Int. Cl.
*B08B 1/16* (2024.01)
*B08B 1/20* (2024.01)
*B08B 9/032* (2006.01)

(52) U.S. Cl.
CPC .......... *B08B 9/032* (2013.01); *B03C 2201/18* (2013.01); *B08B 2209/032* (2013.01)

(58) Field of Classification Search
USPC ........................................ 209/39, 223.2, 229
See application file for complete search history.

(56) References Cited

FOREIGN PATENT DOCUMENTS

| | | | | | |
|---|---|---|---|---|---|
| GB | 2415648 | A | * | 1/2006 | B03C 1/286 |
| JP | 2004016937 | A | * | 1/2004 | B03C 1/00 |

OTHER PUBLICATIONS

Takuo; Ida, "Apparatus for Removing Fine Iron Powder" (English Translation), Jan. 22, 2004, worldwide.esapcenet.com (Year: 2004).*
Zhu; Zhibao, "Automatic Slurry Iron Removal Equipment" (English Translation), Jul. 4, 2023, worldwide.espacenet.com (Year: 2023).*

* cited by examiner

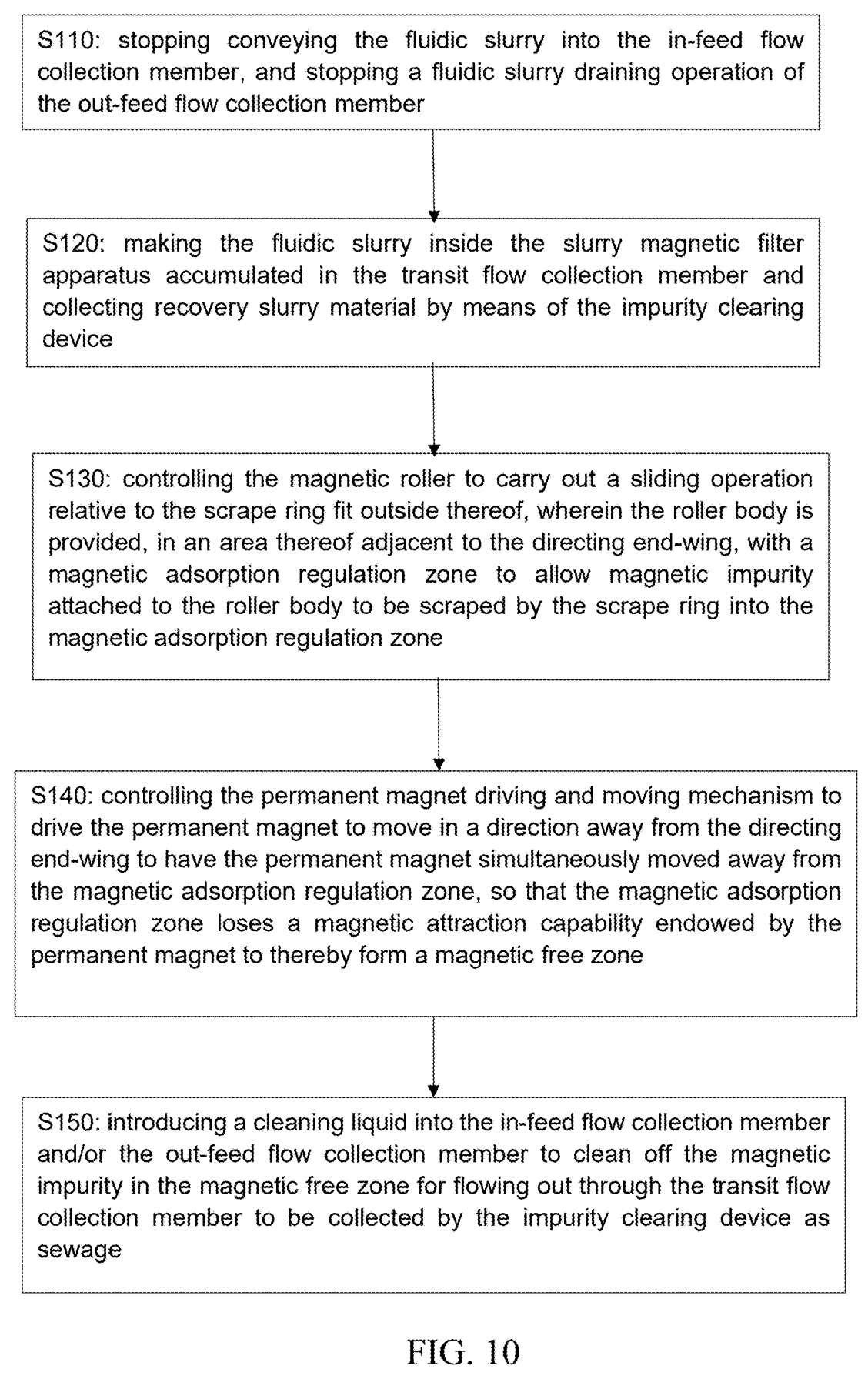

S110: stopping conveying the fluidic slurry into the in-feed flow collection member, and stopping a fluidic slurry draining operation of the out-feed flow collection member

↓

S120: making the fluidic slurry inside the slurry magnetic filter apparatus accumulated in the transit flow collection member and collecting recovery slurry material by means of the impurity clearing device

↓

S130: controlling the magnetic roller to carry out a sliding operation relative to the scrape ring fit outside thereof, wherein the roller body is provided, in an area thereof adjacent to the directing end-wing, with a magnetic adsorption regulation zone to allow magnetic impurity attached to the roller body to be scraped by the scrape ring into the magnetic adsorption regulation zone

↓

S140: controlling the permanent magnet driving and moving mechanism to drive the permanent magnet to move in a direction away from the directing end-wing to have the permanent magnet simultaneously moved away from the magnetic adsorption regulation zone, so that the magnetic adsorption regulation zone loses a magnetic attraction capability endowed by the permanent magnet to thereby form a magnetic free zone

↓

S150: introducing a cleaning liquid into the in-feed flow collection member and/or the out-feed flow collection member to clean off the magnetic impurity in the magnetic free zone for flowing out through the transit flow collection member to be collected by the impurity clearing device as sewage

FIG. 10

SLURRY MAGNETIC FILTER APPARATUS AND CLEANING METHOD THEREOF

FIELD OF THE INVENTION

The present invention relates to the technical field of slurry magnetic filter apparatus, and more particularly to a slurry magnetic filter apparatus and a cleaning method.

DESCRIPTION OF THE RELATED ART

Currently, a slurry magnetic filter apparatus is necessary equipment for removing magnetic substances from products in the industries of new energy, chemical engineering, food, and medicine, and two major key indicators of slurry magnetic filter apparatuses of this kind are effects of demagnetization (effect of adsorbing magnetic impurity) and impurity clearing.

As shown in FIG. 1, which is a schematic structure drawing of a prior art slurry magnetic filter apparatus, it can be seen from the drawings that the known slurry magnetic filter apparatus possesses an advantage of simple and compact structure, in which flow tubes are arranged in a serial-connection configuration for flowing through individual tubes, exhibiting an excellent effect of removing the magnetic, yet having a relatively small flowing area, making the yield low. The key point is that it also suffers a sophisticated process of cleaning, requiring individually removing each magnetic rod for cleaning and then re-mounted. The cleaning operation takes a long time and wastes human labor and material, and is easy to leak, leading to risks with regard to sealing.

Further, to alleviate the above problems, Chinese Patent No. CN02107670.7, entitled a magnetic filter, as well as patents or patent applications of the same family, discloses a magnetic filter that uses a filter to remove magnetic particles from fluid. The filter comprises slender, circumferentially-spaced-apart magnetic elements. The magnetic elements catch the particles carried in the fluid. The magnetic elements must be cleaned periodically by moving a scraping tool from one end of the housing to an opposite end in order to remove the particles from the element. When the scraping plate is moved to an end of travel, the particles are scraped onto a magnetic free end portion of the magnetic element (the end portion having residual magnetism), and fluid that passes through the entrance and other openings of the housing may flush the particles off the magnetic free end portion.

In the above patent, a magnetic free zone is provided on an end portion of the magnetic element (a magnet bar), and the magnet bar is moved upwards and downwards to collaborate with the scraping tool to "drive" the magnetic impurity (including impurity of iron chips) from a magnetic zone to the magnetic free zone. Subsequently, the magnetic impurity in the magnetic free zone is flushed off and an effect of bettering the cleaning operation is achieved.

Patents or patent applications, such as Chinese Patent Application No. CN201810023450.0, entitled a back-washing magnetic filter, adopting an end portion magnetic free zone and applying moving upwards and downwards to resolve the cleaning issues are all similar, and repeated discussion will be omitted.

Further, Chinese Patent Application No. CN201711204017.9 takes a different way to handle such a problem, and discloses a fully-automized magnetic filter that comprises a device barrel, magnetic rollers, scrapers, and an electrical machine. The number of the magnetic rollers is four, which are individually arranged in an interior of the device barrel. The magnetic roller comprises an outer layer and an inner core. The outer layer is fit outside of the inner core. The inner core comprises a magnetic zone and a magnetic free zone. The outer layers of the plurality of magnetic rollers are connected and driven by means of toothed wheels, and one of the magnetic rollers is connected to the electrical machine to be driven to rotate by the electrical machine. The number of the scrapers is the same as the number of the magnetic rollers, and each of the scrapers corresponds to the outer layer of one of the magnetic rollers. Iron chips that are attracted and attached to the outer layer, when rotated to the magnetic free zone, can be scraped off by the scraper. As such, operations for attracting iron chips and scraping off iron chips can be performed simultaneously to effectively enhance the working efficiency.

The above patent application is different from the one having the magnetic free zone arranged at the end zone in that to improve the utilization of the longitudinally-arranged magnet bar, namely in the lengthwise direction, the entire magnet bar is provided with an effect of magnetic adsorption, while the magnetic free zone is arranged in a radial direction (horizontally arranged), and as being different from moving upwards and downward to scrape off magnetic impurity, it adopts a rotating operation to implement the operation of scraping off magnetic impurity.

It is noted that the following technical documents are revealed after an inventiveness search for the application:

(1) CN201310460245.8, entitled a filter device, and patents or patent applications of the family;

(2) CN202211268446.3, entitled a magnetic filter; and (3) CN201811395032.0, entitled a filter and the likes.

In view of the above, the technical solutions proposed and disclosed in the known prior technical documents mentioned above all requires sacrifice of an effective magnetic adsorption surface area of a magnet bar, namely the magnetic free end eliminates the magnetic adsorption surface area of a portion of the effective length (in the axial direction) and a radial magnetic free portion eliminates the magnetic adsorption surface area of the effective radial portion.

Of course, to resolve the above problems, Chinese Patent Application No. CN201210240994.5, entitled a shutoff power-free magnetic filter, adopts an electromagnetic measure for resolution, namely electricity is applied to generate magnetism for implementing operation of adsorbing magnetic impurity. A cleaning operation can be implemented when power is off and the magnetism vanishes. However, although the issue of cleaning is resolved, it causes a great consumption of energy. Such an electromagnetic measure will be gradually marginalized.

SUMMARY OF THE INVENTION

An objective of the present invention is to alleviate the deficiency of the known technology by providing a slurry magnetic filter apparatus and a cleaning method, in which a permanent magnet is still adopted to serve as a magnetic adsorption system, while featuring a relatively large effective magnetic attraction surface area and better resolution for issues of cleaning.

The objective of the present invention is achieved by the following technical solution:

A slurry magnetic filter apparatus for allowing a fluidic slurry to flow and pass therethrough and for adsorbing magnetic impurity contained in the fluidic slurry, comprises a magnetic adsorption device which comprises a plurality of magnetic adsorption barrels. The magnetic adsorption barrel comprises a barrel body, a magnetic roller, and a scrape ring, the magnetic roller being arranged in an interior of the barrel body, the magnetic roller being reciprocally slidable relative to the scrape ring that is fit outside of the magnetic roller.

The slurry magnetic filter apparatus further comprises: a parallel-connection flow collection device and an impurity clearing device. The parallel-connection flow collection device comprises: an in-feed flow collection member, a transit flow collection member, and an out-feed flow collection member.

The plurality of magnetic adsorption barrels are grouped as: an in-feed barrel set, a transit barrel set, and an out-feed barrel set, the in-feed barrel set being separately in communication with the in-feed flow collection member and the transit flow collection member, the transit barrel set being in communication with the transit flow collection member, the out-feed barrel set being separately in communication with the transit flow collection member and the out-feed flow collection member, so that the fluidic slurry flows in sequence through the in-feed flow collection member, the in-feed barrel set, the transit flow collection member, the transit barrel set, the out-feed barrel set, and the out-feed flow collection member.

The magnetic roller comprises a roller body, a permanent magnet, a directing end-wing, and a permanent magnet driving and moving mechanism, the roller body being reciprocally slidable relative to the scrape ring that is fit outside of the magnetic roller, the permanent magnet being arranged in an interior of the roller body, the directing end-wing being connected to a free end of the roller body, the permanent magnet driving and moving mechanism being connected to the permanent magnet and operable to drive the permanent magnet to move in a direction approaching or away from the directing end-wing.

The impurity clearing device is in communication with the transit flow collection member.

In some embodiments, the in-feed barrel set comprises a multiplicity of parallel-connected ones of the magnetic adsorption barrels.

In some embodiments, the in-feed flow collection member comprises an in-feed valve, an in-feed curved tube, an in-feed flow collection cone, and an in-feed closure board, the in-feed curved tube being in communication with the in-feed valve and the in-feed flow collection cone respectively, the in-feed closure board covering and closing the in-feed flow collection cone, each of the magnetic adsorption barrels of the in-feed barrel set being connected, at an end thereof, to the in-feed closure board, so that the end of each of the magnetic adsorption barrels of the in-feed barrel set is in communication with the in-feed flow collection cone.

In some embodiments, the transit barrel set specifically comprises: a first group of a multiplicity of parallel-connected the magnetic adsorption barrels and a second group of a multiplicity of parallel-connected the magnetic adsorption barrels.

The transit flow collection member comprises a first transit flow collection terminal box, a second transit flow collection terminal box, and a third transit flow collection terminal box, the first transit flow collection terminal box being in communication with the in-feed barrel set, the first transit flow collection terminal box being also in communication with a first end of each of the magnetic adsorption barrels of the first group, the second transit flow collection terminal box being in communication with a second end of each of the magnetic adsorption barrels of the first group and a first end of each of the magnetic adsorption barrels of the second group respectively, the third transit flow collection terminal box being in communication with a second end of each of the magnetic adsorption barrels of the second group and the out-feed barrel set respectively.

In some embodiments, the impurity clearing device comprises: a first unloading tube, a first unloading valve, a second unloading tube, a second unloading valve, a sewage discharge tube, a sewage discharge valve, a material recovery tube, and a material recovery valve, a first end of the first unloading tube being in communication with the transit flow collection member, the first unloading valve being mounted on the first unloading tube, a second end of the first unloading tube being in communication with a first end of the second unloading tube, the second unloading valve being mounted on the second unloading tube, a second end of the second unloading tube being in communication with the in-feed flow collection member, the second end of the first unloading tube being further in communication with a first end of the sewage discharge tube, the sewage discharge valve being mounted on the sewage discharge tube, a first end of the material recovery tube being in communication with the first end of the sewage discharge tube, the material recovery valve being mounted on the material recovery tube.

In some embodiments, the impurity clearing device further comprises a first back wash tube, a first back wash valve, a second back wash tube, and a second back wash valve, the first back wash tube being in communication with the in-feed flow collection member, the first back wash valve being mounted on the first back wash tube, the second back wash tube being in communication with the out-feed flow collection member, the second back wash valve being mounted on the second back wash tube.

In some embodiments, the out-feed barrel set comprises a multiplicity of parallel-connected ones of the magnetic adsorption barrels.

In some embodiments, the out-feed flow collection member comprises an out-feed valve, an out-feed curved tube, an out-feed flow collection cone, and an out-feed closure board, the out-feed curved tube being separately in communication with the out-feed valve and the out-feed flow collection cone, the out-feed closure board covering and closing the out-feed flow collection cone, each of the magnetic adsorption barrels of the out-feed barrel set being connected, at an end thereof, to the out-feed closure board, so that the end of each of the magnetic adsorption barrels of the out-feed barrel set is in communication with the out-feed flow collection cone.

In some embodiments, the slurry magnetic filter apparatus further comprises: a support frame, an elevation drive member, and a merge support member, the elevation drive member being disposed on the support frame, a driving end of the elevation drive member being connected to the merge support member, a fixed end of each of the roller bodies that is distant from the free end being individually connected to the merge support member, the permanent magnet driving and moving mechanism being disposed on the merge support member.

The scrape ring is disposed on the support frame.

In some embodiments, the elevation drive member comprises a pneumatic cylinder, an elevation electrical machine, or a hydraulic elevation device.

In some embodiments, the slurry magnetic filter apparatus further comprises an elevation stroke limiting member which comprises a stroke rod, a stop end portion, and a support sleeve, one end of the stroke rod being connected to the merge support member, the stroke rod movably extending through the support frame, the support sleeve being slidably fit outside of the stroke rod, the support sleeve being located between the support frame and the merge support member, the stop end portion being arranged at one end of the stroke rod that is distant from the merge support member.

In some embodiments, the slurry magnetic filter apparatus further comprises a locking device, the locking device comprising: a locking tongue, a locking seat, a locking bar, and a locking driving member, the locking seat and the locking driving member being separately mounted on the support frame, the locking tongue being mounted on the merge support member, the locking bar being connected to the locking driving member, the locking bar being operable to lock the locking tongue on the locking seat.

In some embodiments, the permanent magnet driving and moving mechanism comprises: a mounting frame and a movement driving member, the mounting frame being disposed in an interior of the roller body, the permanent magnet being disposed on the mounting frame, the movement driving member being connected to the mounting frame, the movement driving member being operable to drive the mounting frame to move in a direction approaching or away from the directing end-wing so as to cause the permanent magnet to move in a direction approaching or away from the directing end-wing.

The roller body is provided, in an area adjacent to the directing end-wing, with a magnetic adsorption regulation zone.

The movement driving member, when driving the mounting frame to get in contact with the directing end-wing, makes at least a portion of the permanent magnet located in the magnetic adsorption regulation zone to provide the magnetic adsorption regulation zone with a magnetic attraction capability endowed by the permanent magnet, and when the movement driving member drives the mounting frame to move away from the directing end-wing, the permanent magnet is simultaneously moved away from the magnetic adsorption regulation zone, so as to make the magnetic adsorption regulation zone lose the magnetic attraction capability endowed by the permanent magnet.

In some embodiments, the roller body is provided, at an area thereof adjacent to the directing end-wing, with a magnetic adsorption regulation zone.

The permanent magnet driving and moving mechanism comprises a bottom air bladder, a first air tube, a top air bladder, and a second air tube, the bottom air bladder and the top air bladder being respectively arranged at two ends of the roller body, the bottom air bladder being interposed between the directing end-wing and the permanent magnet so as to set the bottom air bladder in the magnetic adsorption regulation zone, the first air tube being disposed in an interior of the roller body and in communication with the bottom air bladder, the top air bladder being disposed in the interior of the roller body, the top air bladder being located at one side of the permanent magnet that is distant from the bottom air bladder, the second air tube being in communication with the top air bladder.

In some embodiments, the permanent magnet comprises a plurality of magnet rings sequentially stacked in an interior of the roller body.

Alternatively, the permanent magnet comprises a magnet bar disposed in the interior of the roller body.

In some embodiments, the roller body comprises a stainless steel material or the roller body comprises a magnetic free material.

The directing end-wing comprises a stainless steel material or the roller body comprises a magnetic free material.

In some embodiments, the directing end-wing comprises a seal member and a plurality of wing blades, the seal member being connected to a free end of the roller body for isolating an interior space of the roller body from an interior space of the barrel body by means of the seal member, the plurality of wing blades being arranged at intervals on the seal member.

When the free end of the roller body oscillates, the wing blades support against an inside wall of the barrel body so as to keep a gap between the free end of the roller body and the inside wall of the barrel body.

In some embodiments, the scrape ring comprises an internal sealing ring, an internal channel sealing cap, an external sealing ring, and an external sealing cap, the internal sealing ring being movably fit outside of the roller body, the internal channel sealing cap being fit outside of the internal sealing ring, the external sealing ring being fit outside of the internal channel sealing cap, the external sealing cap being fit outside of the external sealing ring.

In some embodiments, a smooth zone is arranged between the permanent magnet and an inside wall of the roller body, lubricant being applied in the smooth zone.

A slurry magnetic filter apparatus cleaning method, being applicable to implement a cleaning operation for the slurry magnetic filter apparatus described above, comprises the following steps:

- stopping conveying the fluidic slurry into the in-feed flow collection member, and stopping a fluidic slurry draining operation of the out-feed flow collection member;
- making the fluidic slurry inside the slurry magnetic filter apparatus accumulated in the transit flow collection member and collecting recovery slurry material by means of the impurity clearing device;
- controlling the magnetic roller to carry out a sliding operation relative to the scrape ring fit outside thereof, wherein the roller body is provided, in an area thereof adjacent to the directing end-wing, with a magnetic adsorption regulation zone to allow magnetic impurity attached to the roller body to be scraped by the scrape ring into the magnetic adsorption regulation zone;
- controlling the permanent magnet driving and moving mechanism to drive the permanent magnet to move in a direction away from the directing end-wing to have the permanent magnet simultaneously moved away from the magnetic adsorption regulation zone, so that the magnetic adsorption regulation zone loses a magnetic attraction capability endowed by the permanent magnet to thereby form a magnetic free zone; and
- introducing a cleaning liquid into the in-feed flow collection member and/or the out-feed flow collection member to clean off the magnetic impurity in the magnetic free zone for flowing out through the transit flow collection member to be collected by the impurity clearing device as sewage.

Compared with the prior art, the present invention at least offers the following advantages:

In the slurry magnetic filter apparatus, the roller body is provided, in an area adjacent to the directing end-wing, with the magnetic adsorption regulation zone, so that in normal implementation of a magnetic adsorption operation, the magnetic adsorption function endowed by the permanent magnet may still exhibit in the magnetic adsorption regulation zone to greatly increase an effective magnetic adsorption surface area, and when it needs to carry out a cleaning operation, the permanent magnet driving and moving mechanism can be flexibly controlled to drive the permanent magnet to move in a direction away from the directing end-wing and the permanent magnet is caused to simultaneously move away from the magnetic adsorption regulation zone, making the magnetic adsorption regulation zone losing the magnetic attraction function endowed by the permanent magnet to form a magnetic free zone, and a better cleaning operation can be fulfilled for the magnetically attractable impurity abundantly gathering in the magnetic free zone to truly achieve a technical effect of adopting a permanent magnet to serve as a magnetic adsorption system and also featuring a relatively large effective magnetic adsorption surface area for better resolving the cleaning issues.

BRIEF DESCRIPTION OF THE DRAWINGS

To more clearly expound the technical solution of embodiments of the present invention, a brief description will be provided below for the drawings that are necessary for the illustration of the embodiments. It is appreciated that the drawings described below show only some of the embodiments of the present invention, and being not construed as limiting to the claims, those having ordinary skill in the art may envisage other related drawings based on the attached drawings, without creative endeavor.

FIG. 10 is a flow chart showing steps of a cleaning method of a slurry magnetic filter apparatus according to an embodiment of the present invention.

DETAILED DESCRIPTION OF PREFERRED EMBODIMENTS OF THE INVENTION

For better understanding of the present invention, the following provides a more comprehensive description of the present invention by taking reference to the attached drawings. The drawings provide the preferred ways of embodying the present invention. However, the present invention can be embodied in various forms and is not limited to the embodiments described herein. On the contrary, the purpose of providing such embodiments is to allow reader to understand the disclosed contents of the present invention in a more throughout manner.

It is noted that when an element is referred to as being "fixed" on another element, it can be directly arranged on said another element or there can be an intermediate therebetween. When an element is referred to as being "connected" to another element, it can be directly connected to said another element or there can be an intermediate element therebetween. The terms "vertical", "horizontal", "left", and "right", and similar expressions as used herein are only for the purpose of illustration and are not intended to define a sole way of embodying.

Unless otherwise defined, all the terminology and scientific terms used herein are of the same meaning as that commonly understood by the technicians of the art to which the invention belongs. The terminology used in the disclosure of the present invention is only adopted for the purposes of illustrating specific embodiments, and is not for limiting the present invention. The term "and/or" as used herein includes any and all combinations of one or more related items that are listed.

Figure 1:
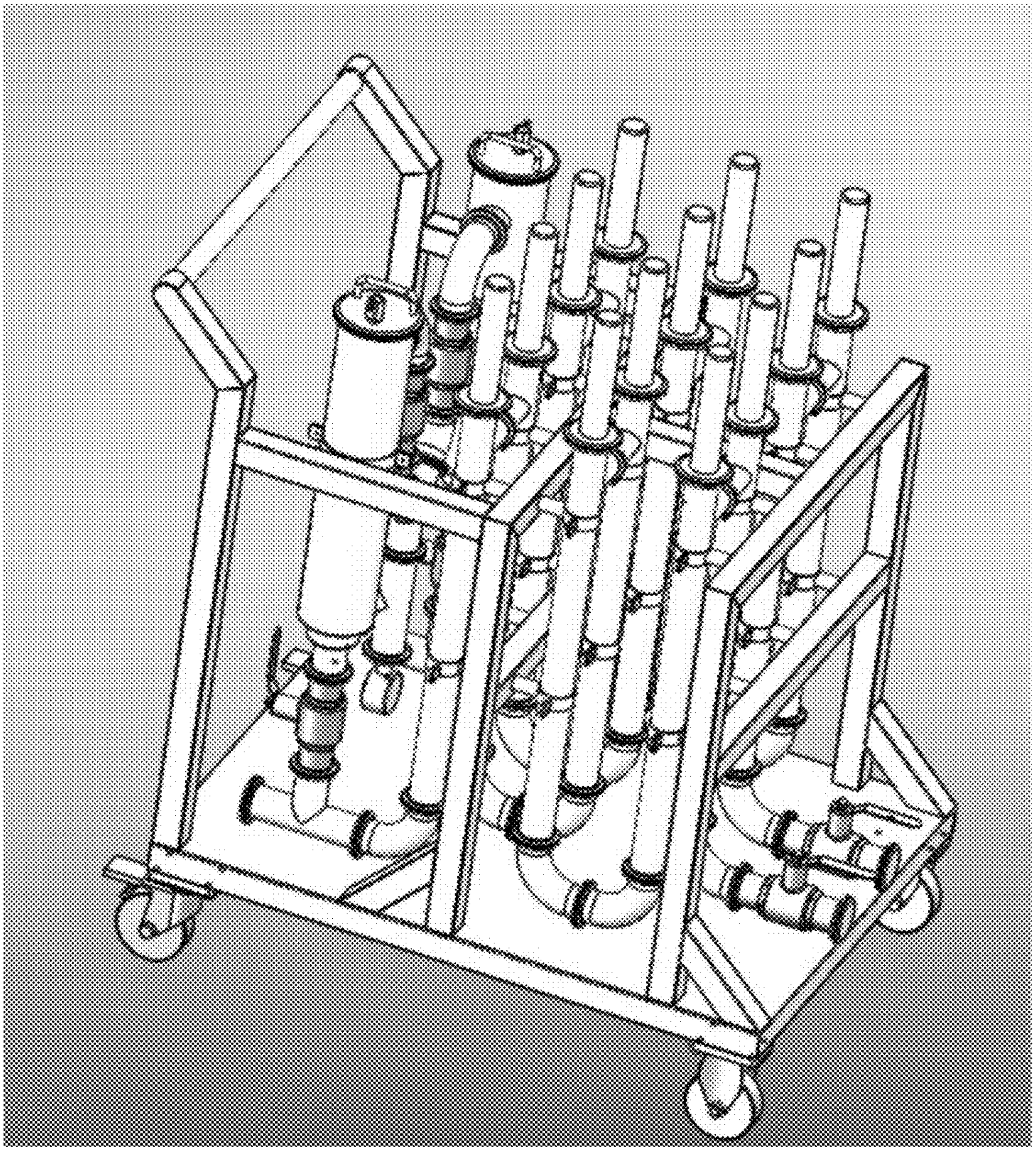
FIG. 1 (Related art)
FIG. 1 is a schematic structure drawing of a prior art slurry magnetic filter apparatus.
Figure 2:
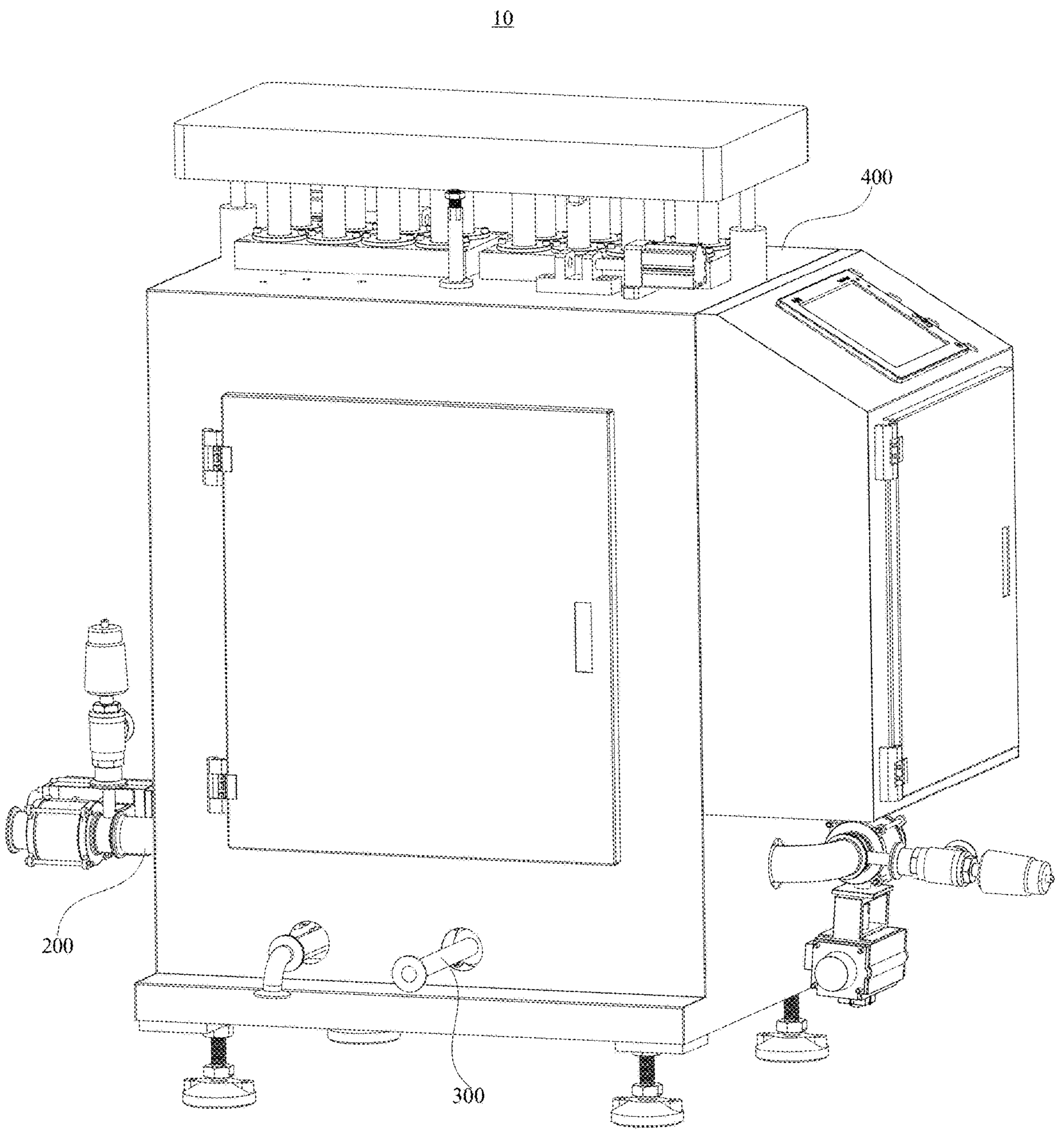
FIG. 2 is a schematic structure drawing showing a slurry magnetic filter apparatus according to an embodiment of the present invention.
Figure 3:
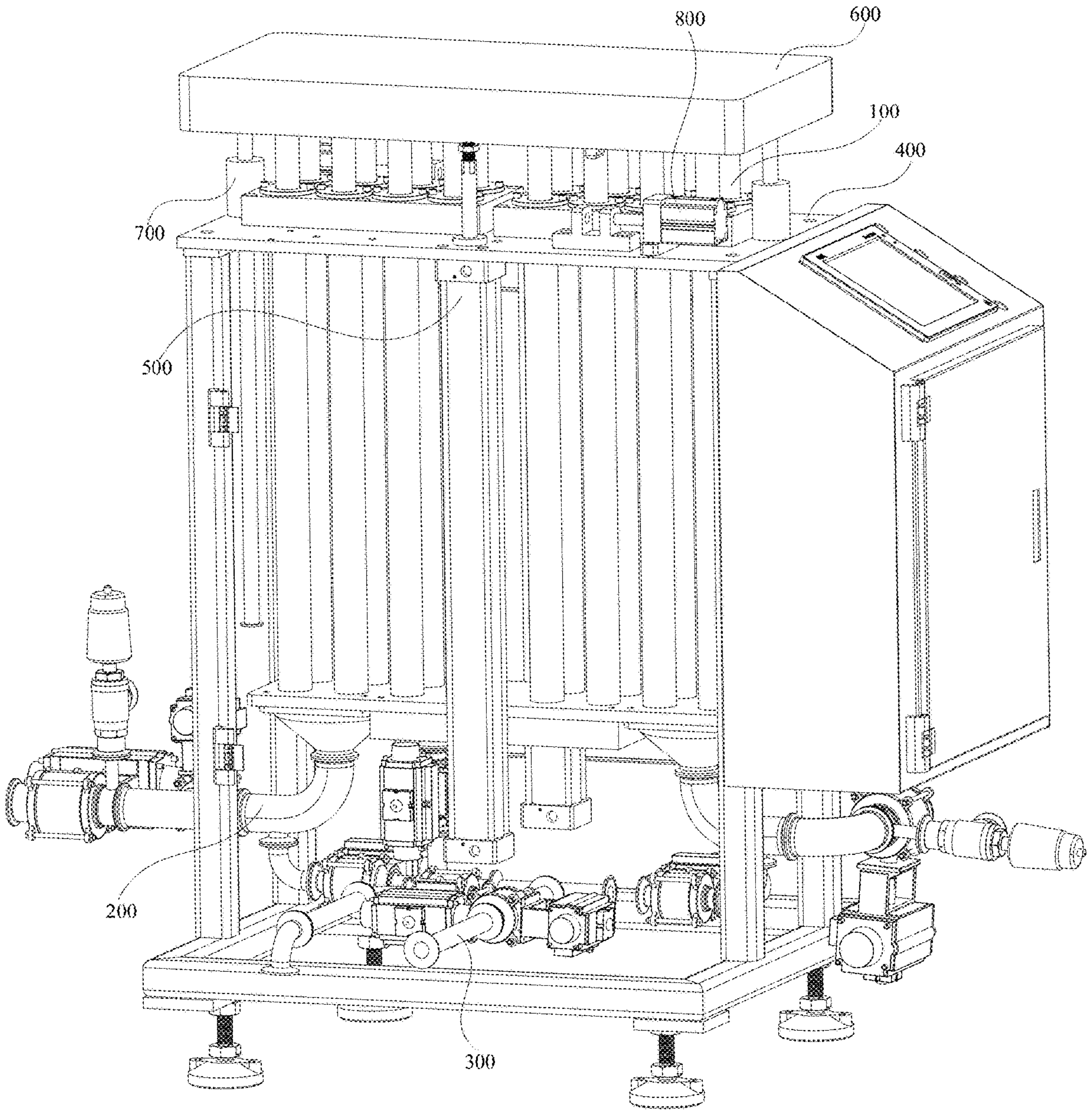
FIG. 3 is a partial schematic structure drawing showing the slurry magnetic filter apparatus shown in FIG. 2.

As shown in FIGS. 2 and 3, a slurry magnetic filter apparatus 10 according to an embodiment comprises: a magnetic adsorption device 100, a parallel-connection flow collection device 200, an impurity clearing device 300, a support frame 400, an elevation drive member 500, a merge support member 600, an elevation stroke limiting member 700, and a locking device 800. The magnetic adsorption device 100, the elevation drive member 500, the elevation stroke limiting member 700, and the locking device 800 are each connected to the support frame 400 to achieve an effect of structure supporting. The slurry magnetic filter apparatus 10 is provided to receive a fluidic slurry to flow and pass therethrough and to adsorb magnetic impurity contained in the fluidic slurry. It is particularly noted that in the disclosure, the magnetic impurity is magnetophilic impurity that is magnetically attractable impurity, and is a kind of impurity to be removed from slurries used in the industries of new energy, chemical engineering, food, and medicine. For example, in the food industry, magnetophilic metals or alloys, such as iron chips, contained in a flowable food slurry all fall in the category of magnetic impurity, and further details will be omitted herein.

Figure 4:
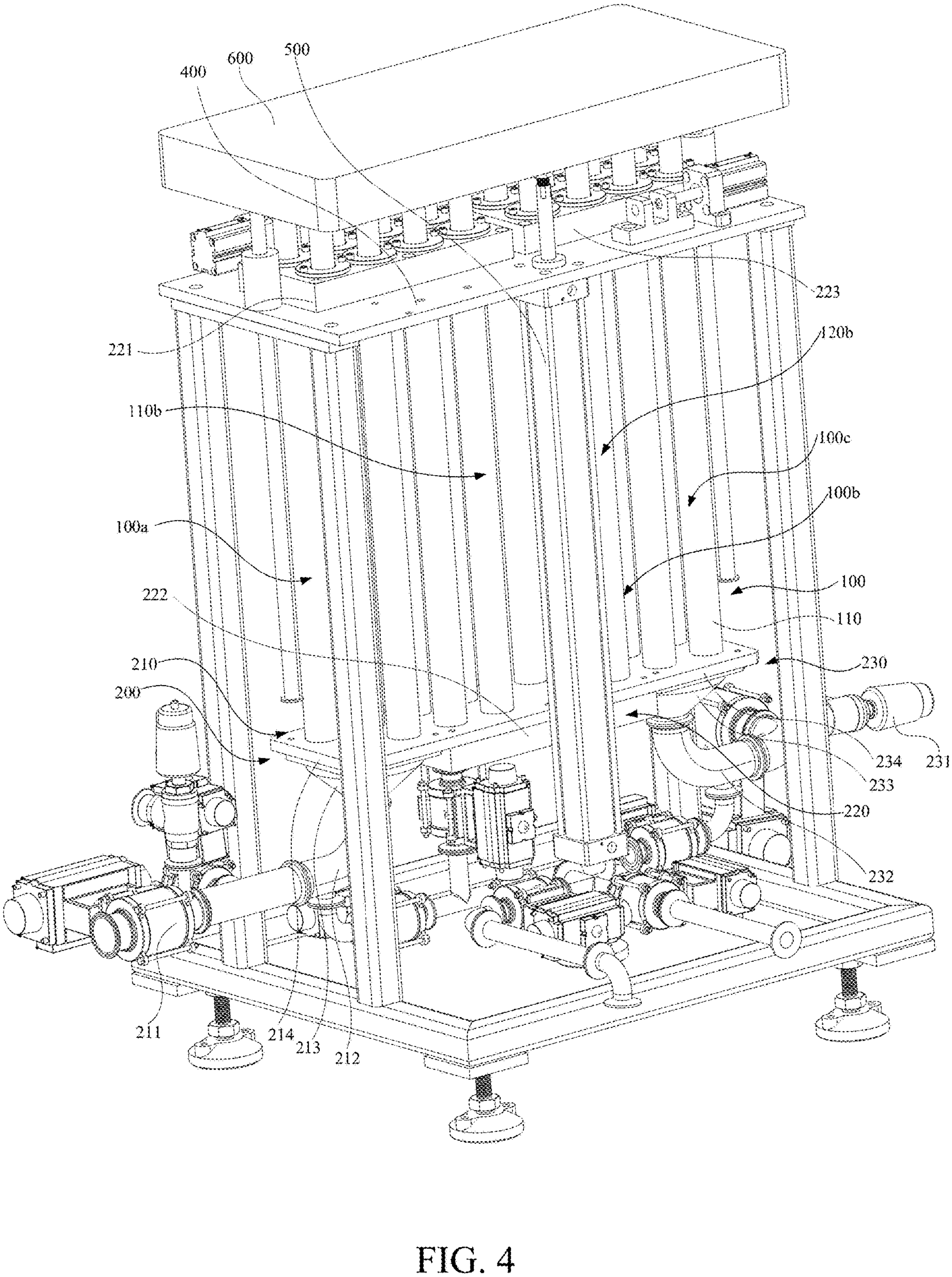
FIG. 4 is a partial schematic structure drawing showing the slurry magnetic filter apparatus shown in FIG. 3.

Referring to FIG. 4, the magnetic adsorption device 100 comprises a plurality of magnetic adsorption barrels 110. When the fluidic slurry flows and passes through the plurality of magnetic adsorption barrels 110, the magnetic adsorption barrels 110 may adsorb and keep the magnetic impurity contained in the fluidic slurry, and the magnetic-impurity-removed fluidic slurry then flows out of the magnetic adsorption barrels 110 to get into a subsequent step of operation.

To better expound the plurality of magnetic adsorption barrels with regard to functionality and flowing relationship, the plurality of magnetic adsorption barrels are classified and grouped. Referring to FIG. 4, the plurality of magnetic adsorption barrels 110 are specifically grouped as: an in-feed barrel set 100*a*, a transit barrel set 100*b*, and an out-feed barrel set 100*c*. The fluidic slurry flows sequentially through the in-feed barrel set 100*a*, the transit barrel set 100*b*, and the out-feed barrel set 100*c* to complete the magnetic adsorption operation process, and the magnetic impurity contained in the fluidic slurry are attracted and kept in the magnetic adsorption barrels of the in-feed barrel set 100*a*, the transit barrel set 100*b*, and the out-feed barrel set 100*c*. At preset intervals of time, the in-feed barrel set 100*a*, the transit barrel set 100*b*, and the out-feed barrel set 100*c* are washed and cleaned to have the magnetic impurity removed therefrom.

In the instant embodiment, the fluidic slurry flows, in sequence, through the in-feed barrel set 100*a*, the transit barrel set 100*b*, and the out-feed barrel set 100*c*, which are set in serial connection with each other. When the fluidic slurry flows into the in-feed barrel set 100*a*, individual ones of the magnetic adsorption barrels of the in-feed barrel set 100*a* are set in parallel connection with each other. Similarly, individual ones of the magnetic adsorption barrels of the out-feed barrel set 100*c* are set in parallel connection with each other. As such, the arrangement of slurry flow channel adopts combined serial and parallel connections so that, in addition to ensure the effect of demagnetization, the flow-over area is increased to increase, to a relatively great extent, the flow-through volume of the slurry in unit time to thereby improve the magnetic adsorption operation efficiency.

Referring to FIG. 4, the parallel-connection flow collection device 200 comprises: an in-feed flow collection member 210, a transit flow collection member 220, and an out-feed flow collection member 230. The in-feed barrel set 100*a* is in communication with the in-feed flow collection member 210 and the transit flow collection member 220 respectively; the transit barrel set 100*b* is in communication with the transit flow collection member 220; the out-feed barrel set 100*c* is in communication with the transit flow collection member 220 and the out-feed flow collection member 230 respectively, so that the fluidic slurry flows in sequence through the in-feed flow collection member 210, the in-feed barrel set 100*a*, the transit flow collection member 220, the transit barrel set 100*b*, the out-feed barrel set 100*c*, and the out-feed flow collection member 230 to complete the slurry flowing process.

Referring to FIG. 4, the in-feed barrel set 100*a* comprises a multiplicity of parallel-connected ones of the magnetic adsorption barrels 110, and this means when the fluidic slurry is flowing into the in-feed barrel set 100*a*, the fluidic slurry is simultaneously flowing into the multiplicity of parallel-connected magnetic adsorption barrels 110. The in-feed flow collection member 210 comprises: an in-feed valve 211, an in-feed curved tube 212, an in-feed flow collection cone 213, and an in-feed closure board 214. The in-feed curved tube 212 is separately in communication with the in-feed valve 211 and the in-feed flow collection cone 213. The in-feed closure board 214 is set on and covers and closes the in-feed flow collection cone 213. Each of the magnetic adsorption barrels 110 of the in-feed barrel set 100*a* is connected, at an end thereof, to the in-feed closure board 214, so that the end of each of the magnetic adsorption barrels 110 of the in-feed barrel set 100*a* is in communication with the in-feed flow collection cone 213 and as such, the in-feed flow collection cone 213 and the in-feed closure board 214 jointly surround and define a sealed space. The sealed space allows the fluidic slurry to merge and transit therethrough, so that the fluidic slurry may then be simultaneously fed into each of the magnetic adsorption barrels 110 of the in-feed barrel set 100*a*.

Referring to FIG. 4, the out-feed barrel set 100*c* comprises a multiplicity of parallel-connected ones of the magnetic adsorption barrels 110, and this means the fluidic slurry is simultaneously flowing into the out-feed barrel set 100*c* by having the fluidic slurry simultaneously flowing into the multiplicity of parallel-connected magnetic adsorption barrels 110, and similarly, simultaneously flowing out of the multiplicity of parallel-connected magnetic adsorption barrels 110 to get into the out-feed flow collection member 230. The out-feed flow collection member 230 comprises an out-feed valve 231, an out-feed curved tube 232, an out-feed flow collection cone 233, and an out-feed closure board 234. The out-feed curved tube 232 is separately in communication with the out-feed valve 231 and the out-feed flow collection cone 233. The out-feed closure board 234 is set on and covers and closes the out-feed flow collection cone 233. Each of the magnetic adsorption barrels 110 of the out-feed barrel set 100*c* is connected, at an end thereof, to the out-feed closure board 234, so that the end of each of the magnetic adsorption barrels 110 of the out-feed barrel set 100*c* is in communication with the out-feed flow collection cone 233 and as such, the out-feed flow collection cone 233 and the out-feed closure board 234 jointly surround and define a sealed space. The sealed space allows the fluidic slurry to merge and transit therethrough, and at this moment, the fluidic slurry has already flowed through the entirety of the slurry magnetic filter apparatus 10, and the operation of adsorbing and removing the magnetic impurity is completed, so that the fluidic slurry flowing out of the out-feed barrel set 100*c* is allowed to enter the operation of a subsequent step, such as slurry for positive and negative electrodes in the new energy industry being fed to an electrode coating operation.

Referring to FIG. 4, the transit barrel set 100*b* specifically comprises: a first group of a multiplicity of parallel-connected magnetic adsorption barrels 110*b* and a second group of a multiplicity of parallel-connected magnetic adsorption barrels 120*b*. The transit flow collection member 220 comprises: a first transit flow collection terminal box 221, a second transit flow collection terminal box 222, and a third transit flow collection terminal box 223. The first transit flow collection terminal box 221 is in communication with the in-feed barrel set 100*a*, and the first transit flow collection terminal box 221 is also in communication with a first end of each of the magnetic adsorption barrels 110*b* of the first group. The second transit flow collection terminal box 222 is separately in communication with a second end of each of the magnetic adsorption barrels 110*b* of the first group and a first end of each of the magnetic adsorption barrels 120*b* of the second group. The third transit flow collection terminal box 223 is separately in communication with a second end of each of the magnetic adsorption barrels 120*b* of the second group and the out-feed barrel set 100*c*.

Figure 7:
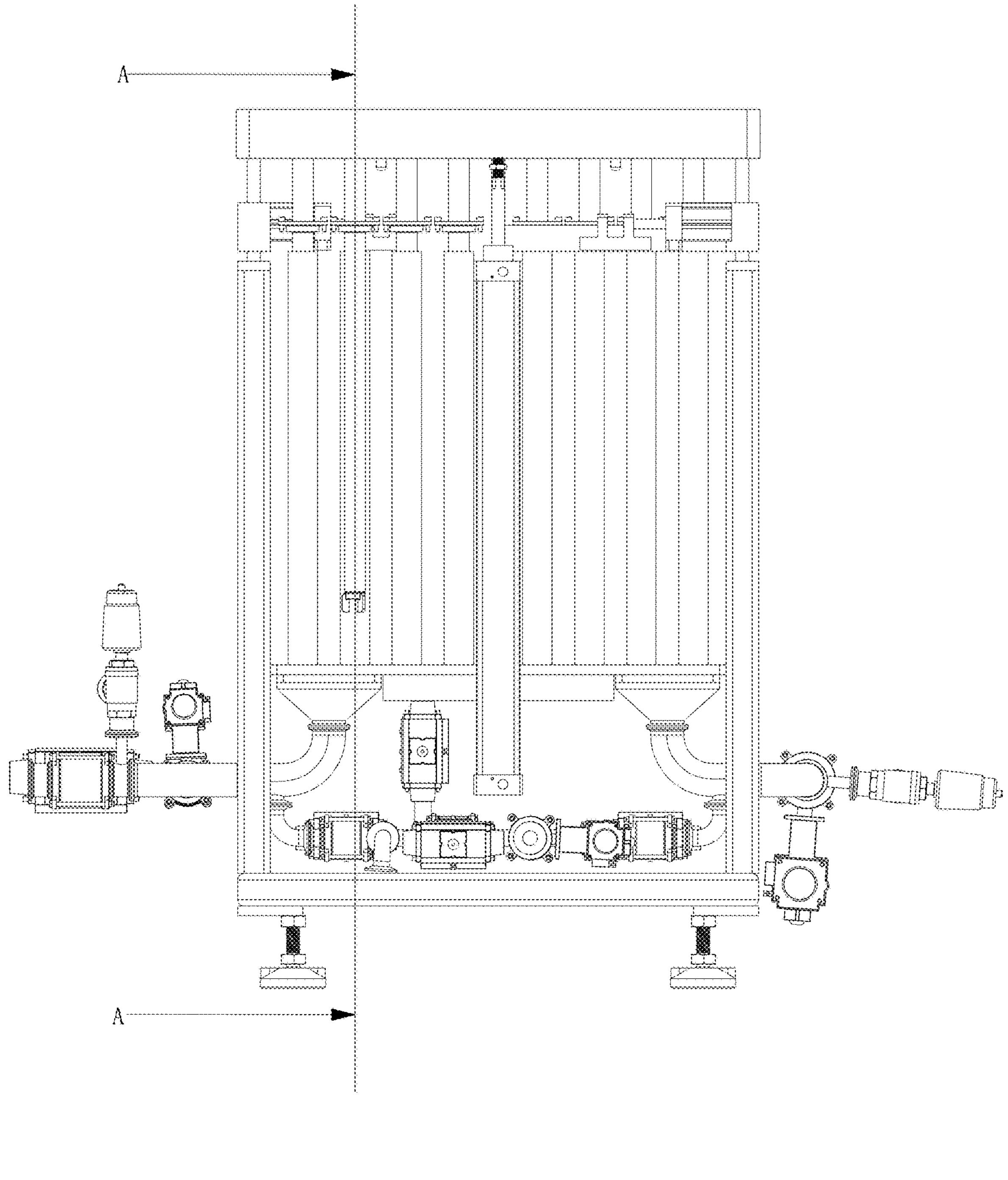
FIG. 7 is a schematic structure drawing, taken from a different perspective, showing the slurry magnetic filter apparatus shown in FIG. 5.

Referring jointly to FIGS. 4 and 7, a way of flowing of the fluidic slurry in the slurry magnetic filter apparatus 10 is as follows: The fluidic slurry flows into the in-feed flow collection member 210, then flows, in parallel, into the in-feed barrel set 100*a*, merges in the first transit flow collection terminal box 221, then flows, in parallel, into the magnetic adsorption barrels 110*b* of the first group, merges in the second transit flow collection terminal box 222, then flows, in parallel, into the magnetic adsorption barrels 120*b* of the second group, merges in the third transit flow collection terminal box 223, then flows, in parallel, into the out-feed barrel set 100*c*, and finally flows into the out-feed flow collection member 230. As such, the fluidic slurry flows through the flow channel of serial-parallel arrangement according to the present technical solution so that, in addition to ensuring the effect of demagnetization, the flow-over area is also increased to increase, to a relatively great extent, the flow-through volume of the slurry in unit time to thereby improve the magnetic adsorption operation efficiency.

Figure 5:
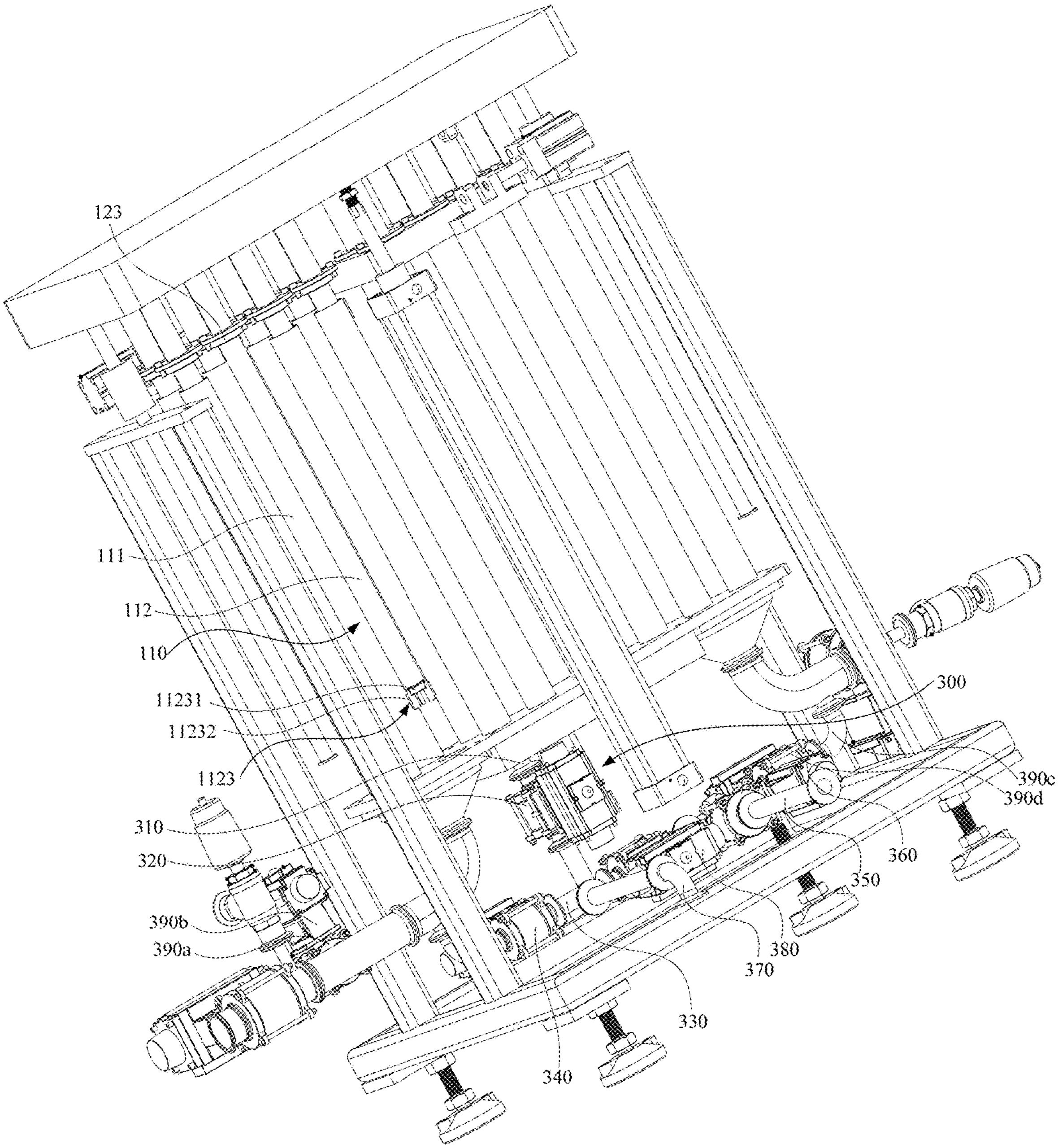
FIG. 5 is a partial schematic structure drawing showing the slurry magnetic filter apparatus shown in FIG. 4.
Figure 8:
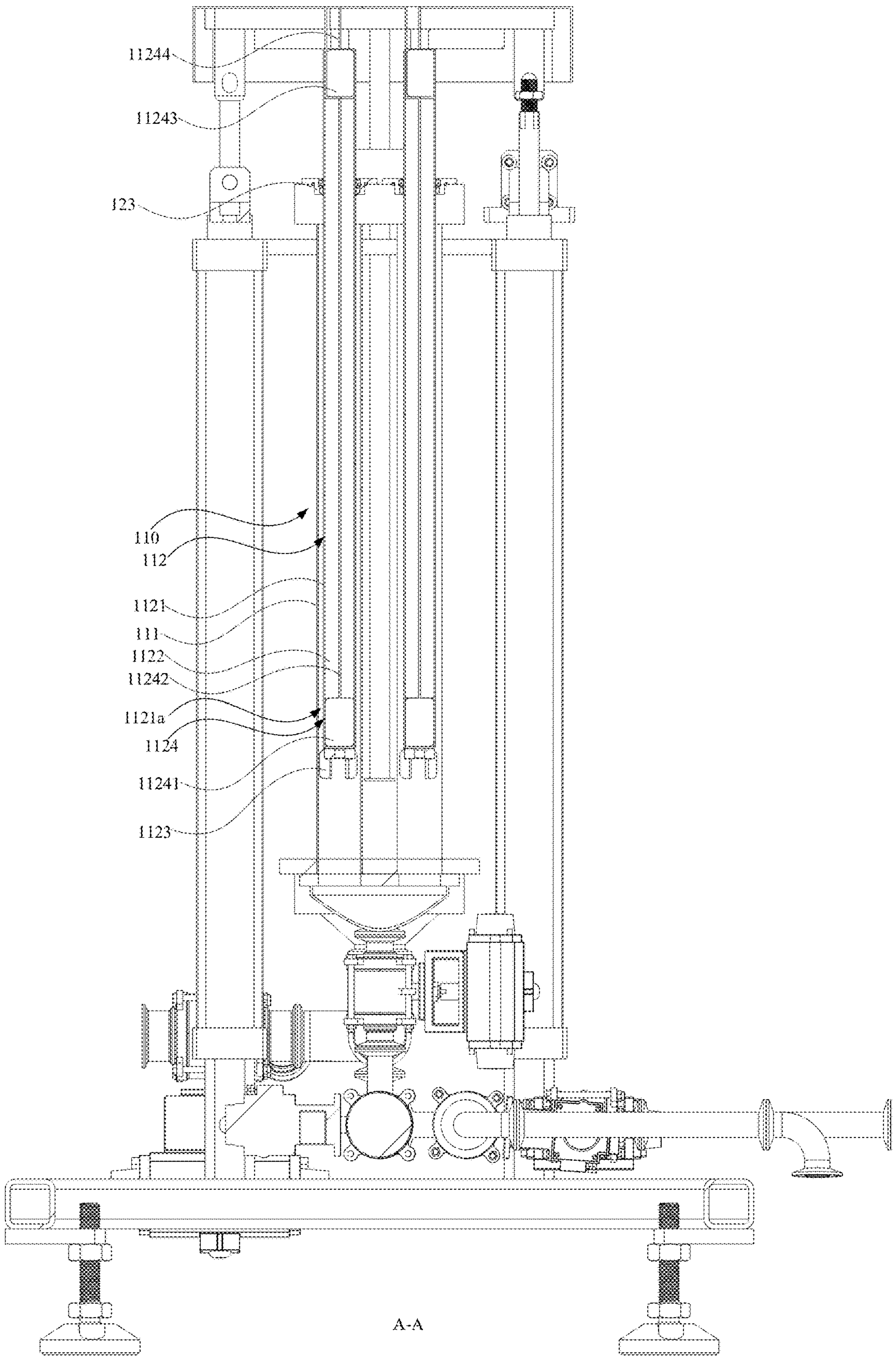
FIG. 8 is a cross-sectional view taken along line A-A of the slurry magnetic filter apparatus shown in FIG. 7.

Referring jointly to FIGS. 5 and 8, the magnetic adsorption barrel 110 comprises a barrel body 111, a magnetic roller 112, and a scrape ring 123. The magnetic roller 112 is disposed internally in the barrel body 111, and the magnetic roller 112 is reciprocally slidable with respect to the scrape ring 123 that is fit outside of the magnetic roller 112. The fluidic slurry, upon entering the magnetic adsorption barrel 110, first fills and flows in a channel space surrounded by and delimited by an inside wall of the barrel body 111 and an outside wall of the magnetic roller 112. When a large quantity of magnetically attractable impurity gathers on the magnetic roller 112, due to the scrape ring 123 being slidably fit outside of the magnetic roller 112, the magnetic roller 112 is caused to slide relative to the scrape ring 123 that is fit outside of the magnetic roller 112 so that the magnetically attractable impurity on the magnetic roller 112 is scraped off and moved by the scrape ring 123 to a free end of the magnetic roller 112, and then, the magnetically attractable impurity can be more easily removed off.

Referring to FIG. 8, the magnetic roller 112 comprises: a roller body 1121, a permanent magnet 1122, a directing end-wing 1123, and a permanent magnet driving and moving mechanism 1124. The roller body 1121 is reciprocally slidable relative to the scrape ring 123 that is fit outside of the magnetic roller 112. The permanent magnet 1122 is received and held in an interior of the roller body 1121. The directing end-wing 1123 is connected to a free end of the roller body 1121. The permanent magnet driving and moving mechanism 1124 is connected to the permanent magnet 1122, and the permanent magnet driving and moving mechanism 1124 is operable to drive the permanent magnet 1122 to move in a direction approaching or away from the directing end-wing 1123. Due to the magnetism of the permanent magnet 1122, when the fluidic slurry fills and flows in the channel space surrounded by and delimited by the inside wall of the barrel body 111 and the outside wall of the magnetic roller 112, the magnetophilic magnetic impurity is magnetically attracted and attached to the outside wall of the roller body 112. When the outside wall of the roller body 1121 gathers such a large quantity of magnetic impurity as to reach a threshold for cleaning, a cleaning operation is then implemented.

Referring to FIG. 10, for better understanding of the creative contribution that the present technical solution made to the prior art technology, the present technical solution also provides a slurry magnetic filter apparatus cleaning method, which is applicable to implement a cleaning operation for any of the described slurry magnetic filter apparatus, and comprises the following steps:

S110: stopping conveying the fluidic slurry into the in-feed flow collection member, and stopping a fluidic slurry draining operation of the out-feed flow collection member.

When the outside wall of the roller body gathers a large quantity of magnetic impurity to reach the threshold for cleaning, the cleaning operation is implemented, and prior to that, it needs to first stop conveying the fluidic slurry into the in-feed flow collection member and stop the fluidic slurry draining operation of the out-feed flow collection member in order to fulfill pre-preparation for magnetic impurity cleaning.

S120: making the fluidic slurry inside the slurry magnetic filter apparatus be accumulated in the transit flow collection member and collecting recovery slurry material by means of the impurity clearing device.

When the degree of out-flowing of the out-feed flow collection member is insufficient, as the impurity clearing device that is arranged at a lowest position allows the fluidic slurry to be driven by its gravity to flow out of the impurity clearing device, and the recovery slurry material is collected for subsequent use, in order to further save material cost and to avoid waste.

During the implementation of Step S120, a high-pressure gas is simultaneously introduced into the in-feed flow collection member and the out-feed flow collection member to better assist the fluidic slurry draining out of the impurity clearing device.

S130: controlling the magnetic roller to carry out a sliding operation relative to the scrape ring fit outside thereof, wherein the roller body is provided, in an area thereof adjacent to the directing end-wing, with a magnetic adsorption regulation zone to allow magnetic impurity attached to the roller body to be scraped by the scrape ring into the magnetic adsorption regulation zone.

Controlling the magnetic roller to conduct a sliding operation relative to the scrape ring fit outside thereof allows the magnetic impurity attached to the roller body to be scraped by the scrape ring into the magnetic adsorption regulation zone, and at this moment, the magnetic impurity on the outside of the entirety of the magnetic roller is collected in the magnetic adsorption regulation zone.

S140: controlling the permanent magnet driving and moving mechanism to drive the permanent magnet to move in a direction away from the directing end-wing to have the permanent magnet simultaneously moved away from the magnetic adsorption regulation zone, so that the magnetic adsorption regulation zone loses a magnetic attraction capability endowed by the permanent magnet to thereby form a magnetic free zone.

It is particularly noted here that when the magnetic roller is in normal operation for magnetic attraction, the area that is adjacent to the free end of the roller body, namely the area of the roller body that is adjacent to the directing end-wing, is essentially filled with the permanent magnet, meaning areas of the roller body that are immersed in the fluidic slurry are all endowed with the magnetic function by the permanent magnet. As such, compared to a prior art roller body that needs to constantly keep a magnetic free zone (the zone being also immersed in the fluidic slurry), the roller body of the present technical solution is provided with the magnetic adsorption regulation zone in an area adjacent to the directing end-wing, and in normal operation of magnetic attraction, the magnetic adsorption regulation zone still holds the magnetic attraction function endowed by the permanent magnet, so that an effective magnetic attraction surface area is maximally increased. For known equipment that are based on public knowledge from the prior technical documents and the market and are publicly available, the magnetic free zone is often provided with a length of 3.5 cm-10 cm. In case that the roller body is made of a stainless steel material, the length can be even greater in order to be free from the influence of magnetism of the permanent magnet. Thus, the magnetic free zone is basically of no function of magnetically adsorbing impurity. Oppositely, the present technical solution still imposes the magnetic adsorption regulation zone with the function of normal operation of magnetically adsorbing impurity. When it is necessary to carry out a cleaning operation, flexible control can be made for the permanent magnet driving and moving mechanism to drive the permanent magnet to move in a direction away from the directing end-wing to also make the permanent magnet simultaneously moving away from the magnetic adsorption regulation zone, making the magnetic adsorption regulation zone losing the magnetic attraction function endowed by the permanent magnet to form a magnetic free zone, and a better cleaning operation can be realized for the magnetically attractable impurity abundantly gathering in the magnetic free zone to truly achieve a technical effect of adopting a permanent magnet to serve as a magnetic adsorption system and also featuring a relatively large effective magnetic adsorption surface area for better resolving the cleaning issues.

S150: introducing a cleaning liquid into the in-feed flow collection member and/or the out-feed flow collection member to clean off the magnetic impurity in the magnetic free zone for flowing out through the transit flow collection member to be collected by the impurity clearing device as sewage.

To better expound the operation principle of the permanent magnet driving and moving mechanism, the present technical solution provide the following two embodiments for the permanent magnet driving and moving mechanism for purposes of reference:

Embodiment 1

Referring to FIG. 8, the magnetic adsorption regulation zone 1121*a* is arranged in an area of the roller body 1121 that is adjacent to the directing end-wing. The permanent magnet driving and moving mechanism 1124 comprises: a bottom air bladder 11241, a first air tube 11242, a top air bladder 11243, and a second air tube 11244. The bottom air bladder 11241 and the top air bladder 11243 are respectively arranged at two ends of the roller body 1121. The bottom air bladder 11241 is interposed between the directing end-wing 1123 and the permanent magnet 1122 so as to set the bottom air bladder 11241 in the magnetic adsorption regulation zone 1121*a*. The first air tube 11242 is disposed in the interior of the roller body 1121 and is in communication with the bottom air bladder 11241. The top air bladder 11243 is disposed in the interior of the roller body 1121, and the top air bladder 11243 is located at one side of the permanent magnet 1122 that is distant from the bottom air bladder 11241. The second air tube 11244 is in communication with the top air bladder 11243.

When the slurry magnetic filter apparatus is normally operating for adsorbing the magnetic impurity, air inside the bottom air bladder 11241 is completely evacuated through the first air tube 11242, and the bottom air bladder 11241 is kept in a deflated state, while simultaneously, air is charged through the second air tube 11244 into the top air bladder 11243 to set the top air bladder 11243 in an inflated state. As such, the permanent magnet 1122 is made to move along the inside wall of the roller body 1121, and the permanent magnet 1122 is caused to have one end thereof received in the magnetic adsorption regulation zone 1121*a*, and at this moment, the magnetic adsorption regulation zone 1121*a* is endowed with the magnetic function for normally implementing the magnetic impurity adsorption operation. When it needs to carry out a cleaning operation for the slurry magnetic filter apparatus, the bottom air bladder 11241 is set in an inflated state and the top air bladder 11243 in a deflated state to cause the bottom end of the permanent magnet to move away from the magnetic adsorption regulation zone, making the magnetic adsorption regulation zone losing the magnetic attraction function endowed by the permanent magnet to form a magnetic free zone.

In the instant embodiment, the first air tube and the second air tube are separately connected with external evacuation equipment.

It is additionally noted that the air bladders used in the present invention are not limited to ones that use air as a flowing medium, other liquids, such as liquid water or liquid oil, may be used as a medium for flowing to change the state of the air bladders for implementing the moving function of the permanent magnet.

Embodiment 2

Figure 9:
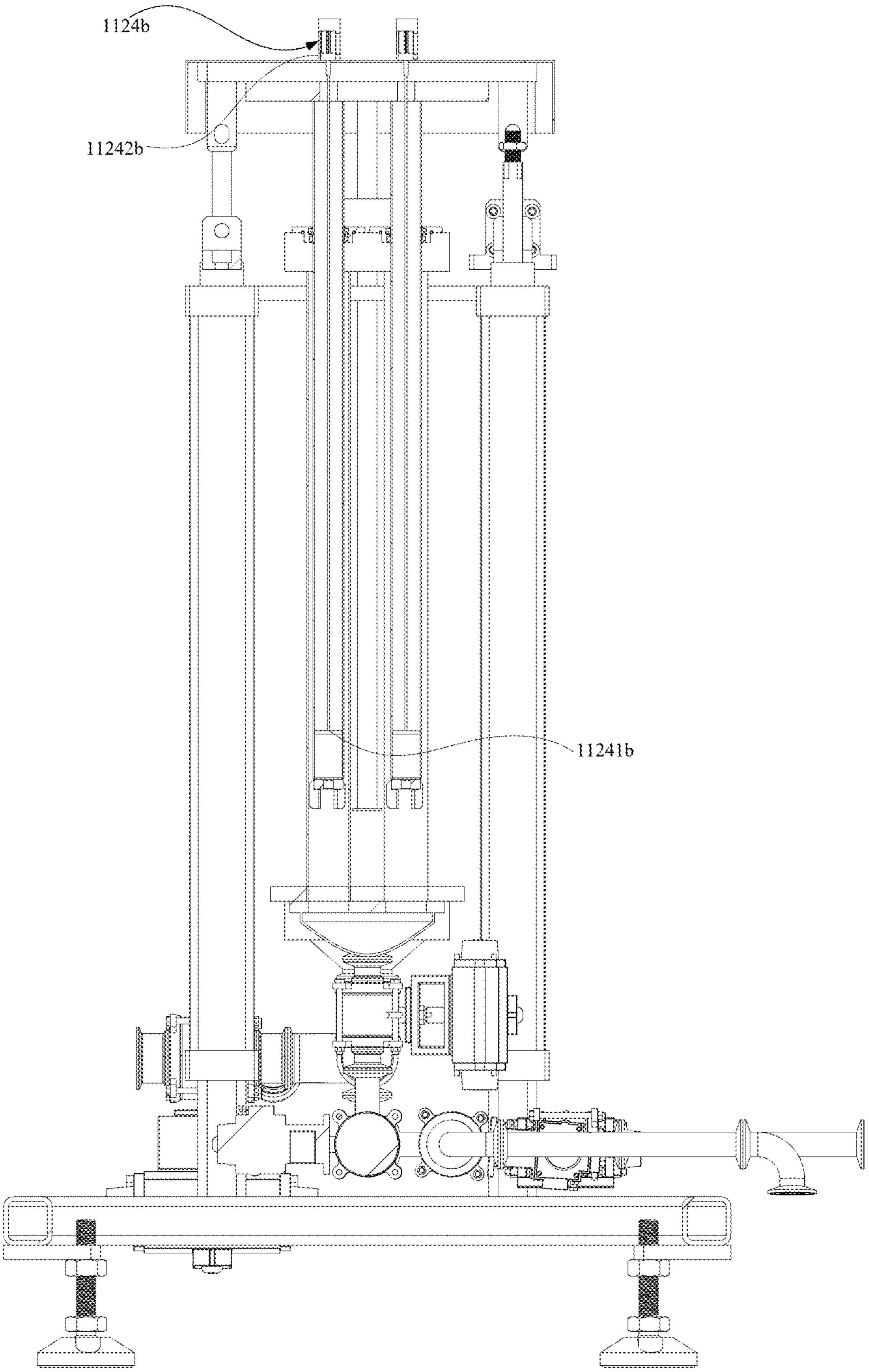
FIG. 9 is a schematic structure drawing showing a slurry magnetic filter apparatus according to another embodiment of the present invention.

Referring to FIG. 9, the permanent magnet driving and moving mechanism 1124*b* comprises: a mounting frame 11241*b* and a movement driving member 11242*b*. The mounting frame is disposed in the interior of the roller body, and the permanent magnet is disposed on the mounting frame. The movement driving member is connected to the mounting frame. The movement driving member is operable to drive the mounting frame to move in a direction approaching or away from the directing end-wing so as to cause the permanent magnet to move in a direction approaching or away from the directing end-wing. The roller body is provided, in an area adjacent to the directing end-wing, with the magnetic adsorption regulation zone. The movement driving member, when driving the mounting frame to get into contact with the directing end-wing, makes at least a portion of the permanent magnet located in the magnetic adsorption regulation zone to provide the magnetic adsorption regulation zone with a magnetic capability endowed by the permanent magnet; and when the movement driving member drives the mounting frame to move away from the directing end-wing, the permanent magnet is simultaneously moved away from the magnetic adsorption regulation zone, so as to make the magnetic adsorption regulation zone lose the magnetic attraction capability endowed by the permanent magnet. In the instant embodiment, the movement driving member 11242*b* is a power device, such as a power cylinder or an elevation electrical machine, which is capable of driving the mounting frame and the permanent magnet to move in the interior of the roller body.

It is particularly noted here that to resolve the technical issues associated with driving of permanent magnet in the present invention, a skilled person in the field may adopt the technical solution proposed in the above-discussed EMBODIMENT 1 or EMBODIMENT 2. Of course, the skilled person in the field may adopt, according to a practical need, other structures to fulfill the function of the permanent magnet driving and moving mechanism and this is surely in the scope of the protection that the present invention pursues.

In the instant embodiment, the permanent magnet comprises a magnet bar disposed in the interior of the roller body, or alternatively, the permanent magnet includes a plurality of magnet rings sequentially stacked in the interior of the roller body. It is of course that provided the permanent magnet may endow the outside wall of the roller body with a function of magnetic attraction to achieve the effect of adsorbing the magnetic impurity, a skilled person in the field may flexibly select different forms or different structures for the permanent magnet, and this falls in the scope of protection that the present invention pursues.

In the instant embodiment, the roller body comprises a stainless steel material or the roller body comprises a magnetic free material. Further, the directing end-wing comprises a stainless steel material or the roller body comprises a magnetic free material. Of course, a skilled artisan in the field may select, according to a practical need, other materials, and this falls in the scope of protection that the present invention pursues.

Figure 5A:
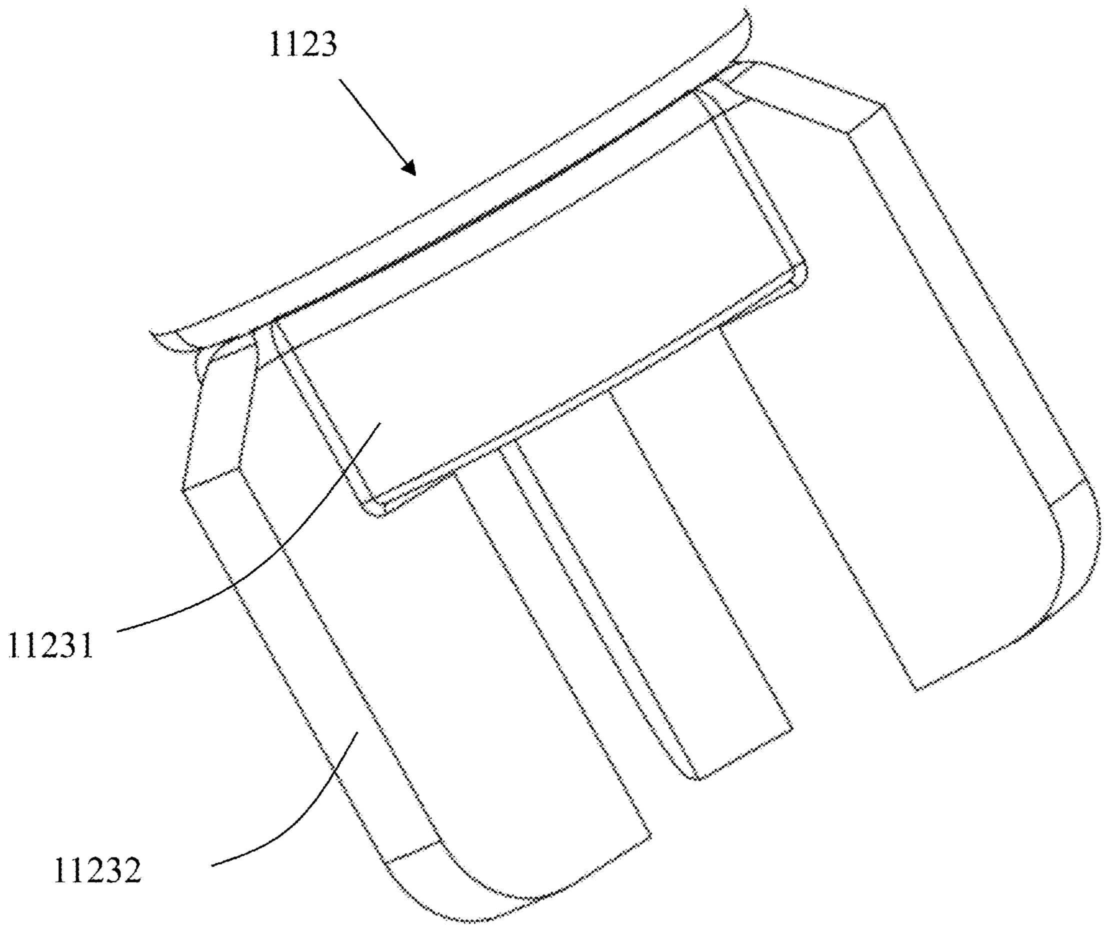
FIG. 5A is an enlarged view of a directing end-wing of the slurry magnetic filter apparatus of FIG. 5.

Referring to FIG. 5 and FIG. 5A, the directing end-wing 1123 comprises a seal member 11231 and a plurality of wing blades 11232. The seal member 11231 is connected to the free end of the roller body for isolating an interior space of the roller body from an interior space of the barrel body by means of the seal member. The plurality of wing blades 11232 are arranged at intervals on the seal member 11231. When the free end of the roller body is oscillating, the wing blades functions to support against the inside wall of the barrel body so as to keep a gap between the free end of the roller body and the inside wall of the barrel body. As such, when the roller body is in relative movement with respect to the barrel body, the plurality of wing blades 11232 help prevent the roller body from directly contacting the barrel body, and particularly to prevent the two magnetically attracted together when they both are made of stainless steel materials so as to alleviate issues of scratching and issues of moving resistance. And, an arrangement of multiple wing blades 11232 is adopted, and gaps among the multiple wing blades 11232 may better reduce the influence on flowing space for the fluidic slurry.

In the instant embodiment, the scrape ring comprises an internal sealing ring, an internal channel sealing cap, an external sealing ring, and an external sealing cap. The internal sealing ring is movably fit outside of the roller body. The internal channel sealing cap is fit outside of the internal sealing ring. The external sealing ring is fit outside of the internal channel sealing cap. The external sealing cap is fit outside of the external sealing ring. As such, the sealing performance can be better enhanced to facilitate the scraping operation of the magnetic impurity on the roller body and also to enhance the structural strength of the physical structure.

In the instant embodiment, a smooth zone is arranged between the permanent magnet and the inside wall of the roller body, and lubricant is applied in the smooth zone. As such, when the permanent magnet driving and moving mechanism drives the permanent magnet to move relative to the roller body, the moving resistance can be greatly reduced so as to alleviate issues of scratching and issues of moving resistance for relative movement between the permanent magnet and the roller body.

Referring to FIG. 5, the impurity clearing device 300 is in communication with the transit flow collection member 220. The impurity clearing device 300 comprises: a first unloading tube 310, a first unloading valve 320, a second unloading tube 330, a second unloading valve 340, a sewage discharge tube 350, a sewage discharge valve 360, a material recovery tube 370, and a material recovery valve 380. A first end of the first unloading tube is in communication with the transit flow collection member. The first unloading valve is mounted on the first unloading tube. A second end of the first unloading tube is in communication with a first end of the second unloading tube. The second unloading valve is mounted on the second unloading tube. A second end of the second unloading tube is in communication with the in-feed flow collection member. The second end of the first unloading tube is further in communication with a first end of the sewage discharge tube. The sewage discharge valve is mounted on the sewage discharge tube. A first end of the material recovery tube is in communication with the first end of the sewage discharge tube. The material recovery valve is mounted on the material recovery tube. As such, slurry recovery material and sewage can be separately collected in a better way by means of the impurity clearing device 300.

Referring to FIG. 5, the impurity clearing device 300 further comprises: a first back wash tube 390*a*, a first back wash valve 390*b*, a second back wash tube 390*c*, and a second back wash valve 390*d*. The first back wash tube is in communication with the in-feed flow collection member. The first back wash valve is mounted on the first back wash tube. The second back wash tube is in communication with the out-feed flow collection member. The second back wash valve is mounted on the second back wash tube. As such, introducing a cleaning liquid for flushing and back washing, or pressurizing and recycling of the recovery material, can be implemented by means of the first back wash tube 390*a*, the first back wash valve 390*b*, the second back wash tube 390*c*, and the second back wash valve 390*d*.

Referring to FIG. 4, the elevation drive member 500 is disposed on the support frame 400. A driving end of the elevation drive member 500 is connected to the merge support member 600. A fixed end of each roller body that is distant from the free end is individually connected to the merge support member 600. The permanent magnet driving and moving mechanism is disposed on the merge support member. The scrape ring is disposed on the support frame. As such, the elevation drive member 500 can be controlled to drive the merge support member 600 to move so as to drive each roller body to move relative to the barrel body and the scrape ring. In the instant embodiment, the elevation drive member may be a pneumatic cylinder, an elevation electrical machine, or a hydraulic elevation device.

Figure 6:
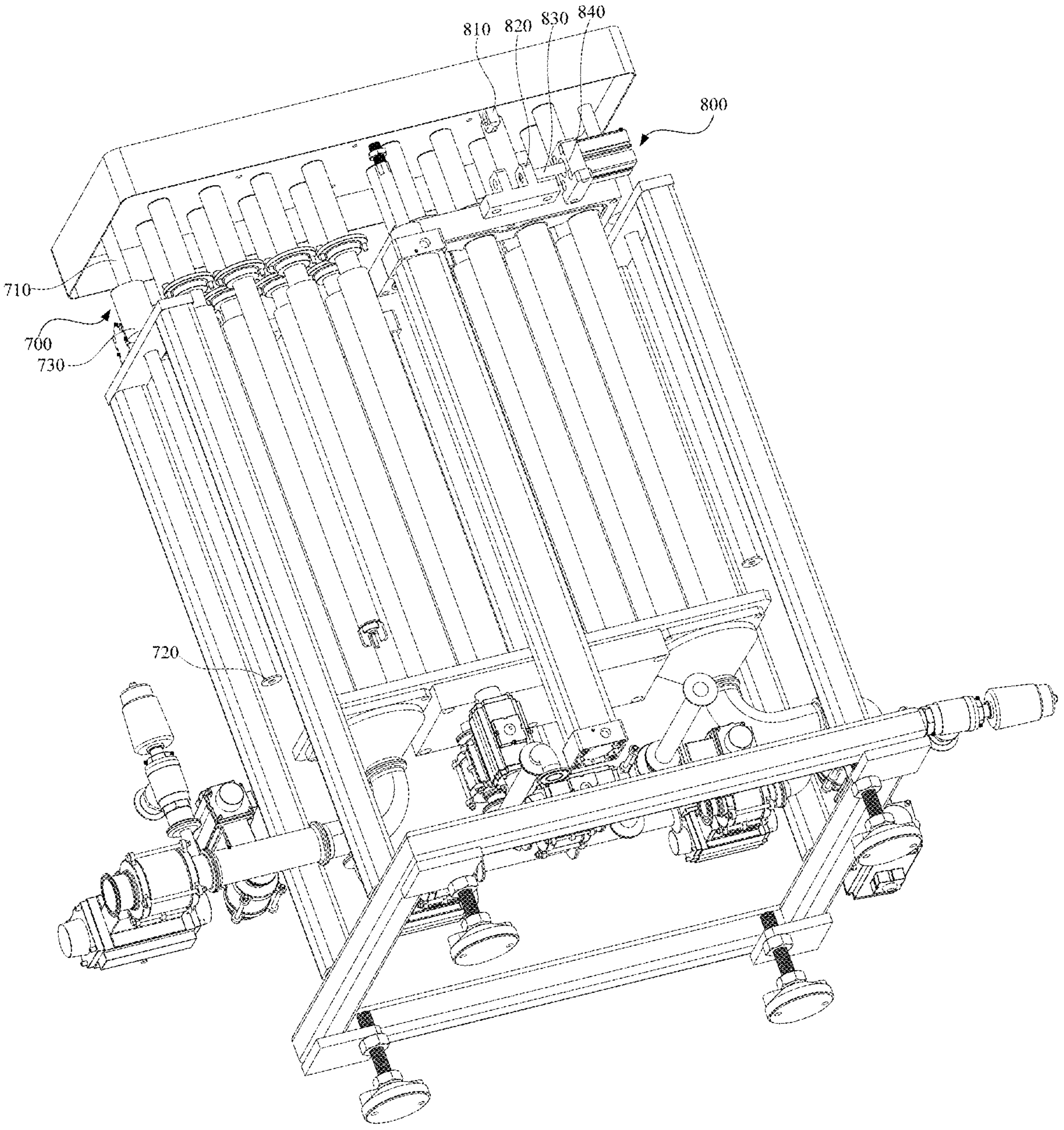
FIG. 6 is a schematic structure drawing, taken from a different perspective, showing the slurry magnetic filter apparatus shown in FIG. 5.

Referring to FIG. 6, the elevation stroke limiting member 700 comprises: a stroke rod 710, a stop end portion 720, and a support sleeve 730. One end of the stroke rod is connected to the merge support member. The stroke rod is arranged to movably extend through the support frame. The support sleeve is slidably fit outside of the stroke rod, and the support sleeve is located between the support frame and the merge support member. The stop end portion is arranged at one end of the stroke rod that is distant from the merge support member. The stroke rod 710 provides a better sliding guide effect when the roller body is moved relative to the barrel body and the scrape ring. The stop end portion 720 is arranged at a tail end of the stroke rod 710 that is distant from the merge support member, and when the roller body finishes the movement stroke, the stop end portion 720 is just in contact with the support frame to fulfill an effect of position limiting and stopping. The support sleeve 730 is located between the support frame and the merge support member to ensure that the directing end-wing may be at a predetermined location when the roller body returns back into the barrel body to thereby prevent issues of interference with a bottom structure of the barrel body in case that the position limiting effect for the directing end-wing is poor.

Referring to FIG. 6, the locking device 800 comprises: a locking tongue 810, a locking seat 820, a locking bar 830, and a locking driving member 840. The locking seat and the locking driving member are respectively mounted on the support frame. The locking tongue is mounted on the merge support member. The locking bar is connected to the locking driving member. The locking bar is operable to lock the locking tongue on the locking seat. As such, when the roller body returns, in position, back into the barrel body, meaning the slurry magnetic filter apparatus is normally performing the operation of adsorption of the magnetic impurity, the locking device 800 locks up the merge support member on the support frame to prevent issues of relative movement between the roller body and the barrel body to thereby ensure the stability of the magnetic adsorption operation.

Compared with the prior art, the present invention at least offers the following advantages:

In the above-described slurry magnetic filter apparatus, the roller body is provided, in an area adjacent to the directing end-wing, with the magnetic adsorption regulation zone, so that in normal implementation of a magnetic adsorption operation, the magnetic adsorption function endowed by the permanent magnet may still exhibit in the magnetic adsorption regulation zone to greatly increase an effective magnetic adsorption surface area, and when it needs to carry out a cleaning operation, the permanent magnet driving and moving mechanism can be flexibly controlled to drive the permanent magnet to move in a direction away from the directing end-wing and the permanent magnet is caused to simultaneously move away from the magnetic adsorption regulation zone, making the magnetic adsorption regulation zone losing the magnetic attraction function endowed by the permanent magnet to form a magnetic free zone, and a better cleaning operation can be fulfilled for the magnetically attractable impurity abundantly gathering in the magnetic free zone to truly achieve a technical effect of adopting a permanent magnet to serve as a magnetic adsorption system and also featuring a relatively large effective magnetic adsorption surface area for better resolving the cleaning issues.

The above-discussed embodiments only illustrate some of the embodiments of the present invention. The illustration is made specific and detailed, and it should not be construed as being limitative to the scope of the claims of the present invention. It is noted that for those having ordinary skill in the art, various changes and modifications can be contemplated without departing from the inventive idea of the present invention, and such are all considered within the scope of protection of the present invention. Thus, the scope of patent protection of the present invention is only defined by the appended claims.

What is claimed is:

1. A slurry magnetic filter apparatus for allowing a fluidic slurry to flow and pass therethrough and for adsorbing magnetic impurity contained in the fluidic slurry, comprising a magnetic adsorption device which comprises a plurality of magnetic adsorption barrels, the magnetic adsorption barrels each comprising a barrel body, a magnetic roller, and a scrape ring, the magnetic roller being arranged in an interior of the barrel body, the magnetic roller being reciprocally slidable relative to the scrape ring that is fit outside of the magnetic roller;

wherein the slurry magnetic filter apparatus further comprises: a parallel-connection flow collection device and an impurity clearing device, the parallel-connection flow collection device comprising: an in-feed flow collection member, a transit flow collection member, and an out-feed flow collection member;

wherein the plurality of magnetic adsorption barrels are grouped as: an in-feed barrel set, a transit barrel set, and an out-feed barrel set, the in-feed barrel set being respectively in communication with the in-feed flow collection member and the transit flow collection member, the transit barrel set being in communication with the transit flow collection member, the out-feed barrel set being respectively in communication with the transit flow collection member and the out-feed flow collection member, so that the fluidic slurry flows in sequence through the in-feed flow collection member, the in-feed barrel set, the transit flow collection member, the transit barrel set, the out-feed barrel set, and the out-feed flow collection member;

wherein the magnetic roller comprises: a roller body, a permanent magnet, a directing end-wing, and a permanent magnet driving and moving mechanism, the roller body being reciprocally slidable relative to the scrape ring that is fit outside of the magnetic roller, the permanent magnet being arranged in an interior of the roller body, the directing end-wing being connected to a free end of the roller body, the permanent magnet driving and moving mechanism being connected to the permanent magnet and operable to drive the permanent magnet to move in a direction approaching or away from the directing end-wing; and wherein the impurity clearing device is in communication with the transit flow collection member;

wherein the in-feed barrel set comprises a multiplicity of parallel-connected ones of the magnetic adsorption barrels; and wherein the in-feed flow collection member comprises an in-feed valve, an in-feed curved tube, an in-feed flow collection cone, and an in-feed closure board, the in-feed curved tube being respectively in communication with the in-feed valve and the in-feed flow collection cone, the in-feed closure board covering and closing the in-feed flow collection cone, each of the magnetic adsorption barrels of the in-feed barrel set being connected, at an end thereof, to the in-feed closure board, so that the end of each of the magnetic adsorption barrels of the in-feed barrel set is in communication with the in-feed flow collection cone.

2. The slurry magnetic filter apparatus according to claim 1, wherein the transit barrel set specifically comprises: a first group of a multiplicity of parallel-connected the magnetic adsorption barrels and a second group of a multiplicity of parallel-connected the magnetic adsorption barrels; and the transit flow collection member comprises: a first transit flow collection terminal box, a second transit flow collection terminal box, and a third transit flow collection terminal box, the first transit flow collection terminal box being in communication with the in-feed barrel set, the first transit flow collection terminal box being also in communication with a first end of each of the magnetic adsorption barrels of the first group, the second transit flow collection terminal box being respectively in communication with a second end of each of the magnetic adsorption barrels of the first group and a first end of each of the magnetic adsorption barrels of the second group, the third transit flow collection terminal box being respectively in communication with a second end of each of the magnetic adsorption barrels of the second group and the out-feed barrel set.

3. The slurry magnetic filter apparatus according to claim 1, wherein the impurity clearing device comprises: a first unloading tube, a first unloading valve, a second unloading tube, a second unloading valve, a sewage discharge tube, a sewage discharge valve, a material recovery tube, and a material recovery valve, a first end of the first unloading tube being in communication with the transit flow collection member, the first unloading valve being mounted on the first unloading tube, a second end of the first unloading tube being in communication with a first end of the second unloading tube, the second unloading valve being mounted on the second unloading tube, a second end of the second unloading tube being in communication with the in-feed flow collection member, the second end of the first unloading tube being further in communication with a first end of the sewage discharge tube, the sewage discharge valve being mounted on the sewage discharge tube, a first end of the material recovery tube being in communication with the first end of the sewage discharge tube, the material recovery valve being mounted on the material recovery tube.

4. The slurry magnetic filter apparatus according to claim 3, wherein the impurity clearing device further comprises: a first back wash tube, a first back wash valve, a second back wash tube, and a second back wash valve, the first back wash tube being in communication with the in-feed flow collection member, the first back wash valve being mounted on the first back wash tube, the second back wash tube being in communication with the out-feed flow collection member, the second back wash valve being mounted on the second back wash tube.

5. The slurry magnetic filter apparatus according to claim 1, wherein the out-feed barrel set comprises a multiplicity of parallel-connected ones of the magnetic adsorption barrels.

6. The slurry magnetic filter apparatus according to claim 5, wherein the out-feed flow collection member comprises an out-feed valve, an out-feed curved tube, an out-feed flow collection cone, and an out-feed closure board, the out-feed curved tube being respectively in communication with the out-feed valve and the out-feed flow collection cone, the out-feed closure board covering and closing the out-feed flow collection cone, each of the magnetic adsorption barrels of the out-feed barrel set being connected, at an end thereof, to the out-feed closure board, so that the end of each of the magnetic adsorption barrels of the out-feed barrel set is in communication with the out-feed flow collection cone.

7. The slurry magnetic filter apparatus according to claim 1, wherein the slurry magnetic filter apparatus further comprises: a support frame, an elevation drive member, and a merge support member, the elevation drive member being disposed on the support frame, a driving end of the elevation drive member being connected to the merge support member, a fixed end of each of the roller bodies that is distant from the free end being individually connected to the merge support member, the permanent magnet driving and moving mechanism being disposed on the merge support member; and the scrape ring is disposed on the support frame.

8. The slurry magnetic filter apparatus according to claim 7, wherein the elevation drive member comprises a pneumatic cylinder, an elevation electrical machine, or a hydraulic elevation device.

9. The slurry magnetic filter apparatus according to claim 7, wherein the slurry magnetic filter apparatus further comprises an elevation stroke limiting member, the elevation stroke limiting member comprising: a stroke rod, a stop end portion, and a support sleeve, one end of the stroke rod being connected to the merge support member, the stroke rod movably extending through the support frame, the support sleeve being slidably fit outside of the stroke rod, the support sleeve being located between the support frame and the merge support member, the stop end portion being arranged at one end of the stroke rod that is distant from the merge support member.

10. The slurry magnetic filter apparatus according to claim 7, wherein the slurry magnetic filter apparatus further comprises a locking device, the locking device comprising: a locking tongue, a locking seat, a locking bar, and a locking driving member, the locking seat and the locking driving member being respectively mounted on the support frame, the locking tongue being mounted on the merge support member, the locking bar being connected to the locking driving member, the locking bar being operable to lock the locking tongue on the locking seat.

11. The slurry magnetic filter apparatus according to claim 1, wherein the permanent magnet driving and moving mechanism comprises: a mounting frame and a movement driving member, the mounting frame being disposed in an interior of the roller body, the permanent magnet being disposed on the mounting frame, the movement driving member being connected to the mounting frame, the movement driving member being operable to drive the mounting frame to move in a direction approaching or away from the directing end-wing so as to cause the permanent magnet to move in a direction approaching or away from the directing end-wing;

the roller body is provided, in an area adjacent to the directing end-wing, with a magnetic adsorption regulation zone; and the movement driving member, when driving the mounting frame to get into contact with the directing end-wing, makes at least a portion of the permanent magnet located in the magnetic adsorption regulation zone to provide the magnetic adsorption regulation zone with a magnetic attraction capability endowed by the permanent magnet, and when the movement driving member drives the mounting frame to move away from the directing end-wing, the permanent magnet is simultaneously moved away from the magnetic adsorption regulation zone, so as to make the magnetic adsorption regulation zone lose the magnetic attraction capability endowed by the permanent magnet.

12. The slurry magnetic filter apparatus according to claim 1, wherein the roller body is provided, at an area thereof adjacent to the directing end-wing, with a magnetic adsorption regulation zone; and the permanent magnet driving and moving mechanism comprises: a bottom air bladder, a first air tube, a top air bladder, and a second air tube, the bottom air bladder and the top air bladder being respectively arranged at two ends of the roller body, the bottom air bladder being interposed between the directing end-wing and the permanent magnet so as to set the bottom air bladder in the magnetic adsorption regulation zone, the first air tube being disposed in an interior of the roller body and in communication with the bottom air bladder, the top air bladder being disposed in the interior of the roller body, the top air bladder being located at one side of the permanent magnet that is distant from the bottom air bladder, the second air tube being in communication with the top air bladder.

13. The slurry magnetic filter apparatus according to claim 1, wherein the permanent magnet comprises a plurality of magnet rings sequentially stacked in an interior of the roller body;

or, alternatively, the permanent magnet comprises a magnet bar disposed in the interior of the roller body.

14. The slurry magnetic filter apparatus according to claim 1, wherein the roller body comprises a stainless steel material, the roller body comprises a magnetic free material, or the directing end-wing comprises a stainless steel material.

15. The slurry magnetic filter apparatus according to claim 1, wherein the directing end-wing comprises a seal member and a plurality of wing blades, the seal member being connected to a free end of the roller body for isolating an interior space of the roller body from an interior space of the barrel body by means of the seal member, the plurality of wing blades being arranged at intervals on the seal member; and when the free end of the roller body oscillates, the wing blades support against an inside wall of the barrel body so as to keep a gap between the free end of the roller body and the inside wall of the barrel body.

16. The slurry magnetic filter apparatus according to claim 1, wherein a smooth zone is arranged between the permanent magnet and an inside wall of the roller body, lubricant being applied in the smooth zone.

* * * * *